(12) United States Patent
Wen et al.

(10) Patent No.: US 12,256,788 B2
(45) Date of Patent: Mar. 25, 2025

(54) SYSTEMS AND METHODS FOR DESIGNING AND FABRICATING MASS-CUSTOMIZED PRODUCTS

(71) Applicants: Ashley Wen, Redwood City, CA (US); Huafeng Wen, Redwood City, CA (US)

(72) Inventors: Ashley Wen, Redwood City, CA (US); Huafeng Wen, Redwood City, CA (US)

(*) Notice: Subject to any disclaimer, the term of this patent is extended or adjusted under 35 U.S.C. 154(b) by 371 days.

(21) Appl. No.: 17/821,008

(22) Filed: Aug. 19, 2022

(65) Prior Publication Data
US 2024/0057696 A1  Feb. 22, 2024

(51) Int. Cl.
| | |
|---|---|
| *G06F 30/12* | (2020.01) |
| *A41C 5/00* | (2006.01) |
| *G06F 30/23* | (2020.01) |
| *G06F 30/27* | (2020.01) |
| *G06T 13/40* | (2011.01) |
| *G06T 17/00* | (2006.01) |
| *G06V 10/10* | (2022.01) |
| *G06V 10/77* | (2022.01) |
| *G06V 40/10* | (2022.01) |

(52) U.S. Cl.
CPC ............... *A41C 5/00* (2013.01); *G06T 13/40* (2013.01); *G06V 10/17* (2022.01); *G06V 10/7715* (2022.01); *G06V 40/10* (2022.01)

(58) Field of Classification Search
CPC ........... A41C 5/00; G06T 13/40; G06T 17/00; G06V 10/17; G06V 10/7715; G06V 40/10; G06F 30/12; G06F 2119/18; G06F 30/23; G06F 2111/16; G06F 2113/12; G06F 30/27
See application file for complete search history.

(56) References Cited

U.S. PATENT DOCUMENTS

| | | | |
|---|---|---|---|
| 2013/0150704 A1* | 6/2013 | Vitek | A61B 5/4538 600/411 |
| 2017/0340024 A1* | 11/2017 | McKeen | A41C 3/06 |
| 2023/0248099 A1* | 8/2023 | Ziegler | A41H 3/04 700/97 |

FOREIGN PATENT DOCUMENTS

WO    WO-2012066555 A2 *   5/2012    ........... G01B 11/022

OTHER PUBLICATIONS

Sun, 3D bra and human interactive modeling using finite element method for bra design, Computer-Aided Design 114 (2019) 13-27 (Year: 2019).*
Bosquet, Body Scan Processing, Generative Design, and Multi objective Evaluation of Sports Bras, Appl. Sci. Oct. 2020, 6126; doi: 10.3390/app10176126 (Year: 2020).*
Meng, Computer aided clothing pattern design with 3D editing and pattern alteration, Computer-Aided Design 44 (2012) 721-734 (Year: 2012).*

(Continued)

*Primary Examiner* — Vu Le
*Assistant Examiner* — Lei Zhao
(74) *Attorney, Agent, or Firm* — PatentPC PowerPatent; Bao Tran

(57) ABSTRACT

Systems and methods are disclosed for fabrication of custom clothing with enhanced support for a body part by digitizing a 3D-model of a person, performing anatomy detection and localization of the body part, applying force analysis to design a structure that supports the body part, and fabricating the structure.

19 Claims, 15 Drawing Sheets

(56) References Cited

OTHER PUBLICATIONS

TRUFF13SHUFF13, Morph Effect in After Effects [no plug-ins], youtube.com/watch ?v=8374FIFrkuM, May 9, 2019 (Year: 2019).*
Oddthing, Image Hover Fade Out, SQUARESPACE Forum, forum.squarespace.com/topic/168659-image-hover-fade-out/, Aug. 24, 2020 (Year: 2020).*

* cited by examiner

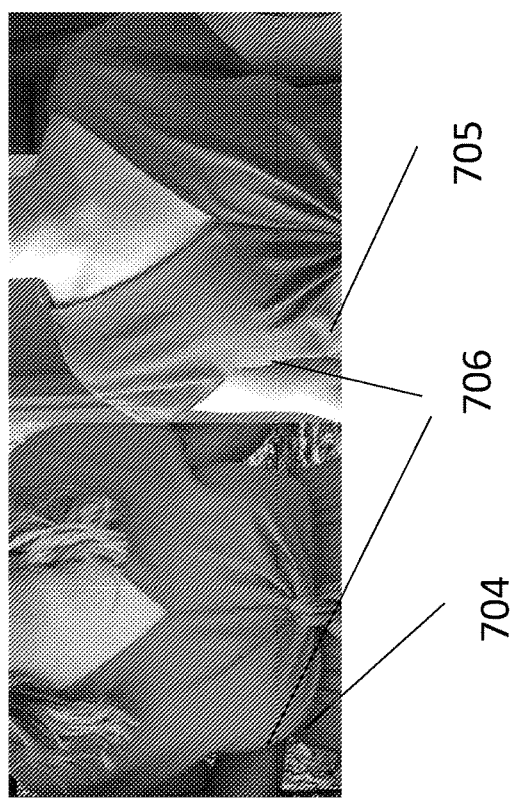
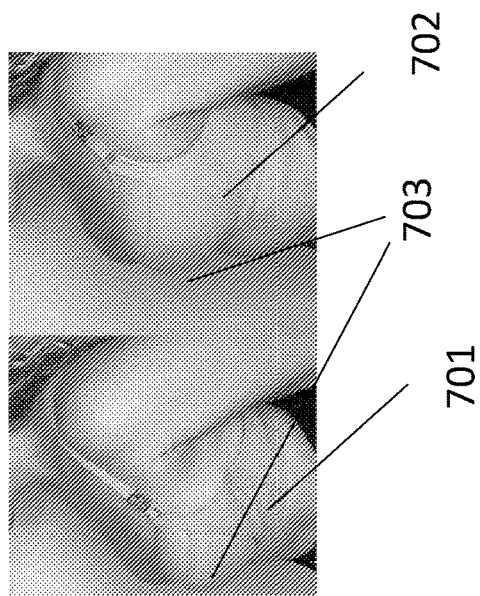
Figure 7

Figure 10

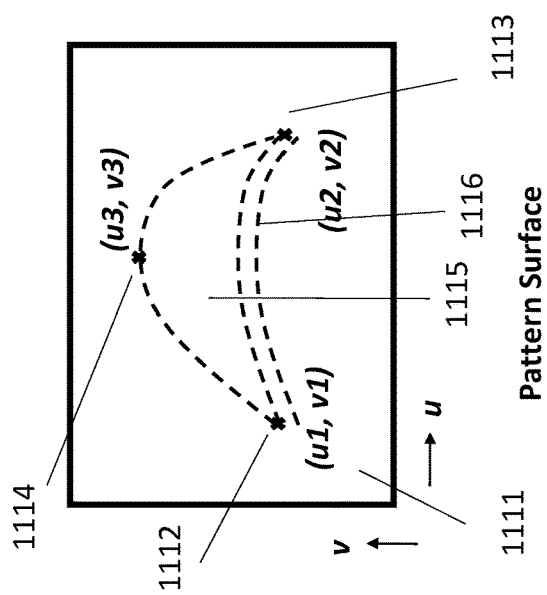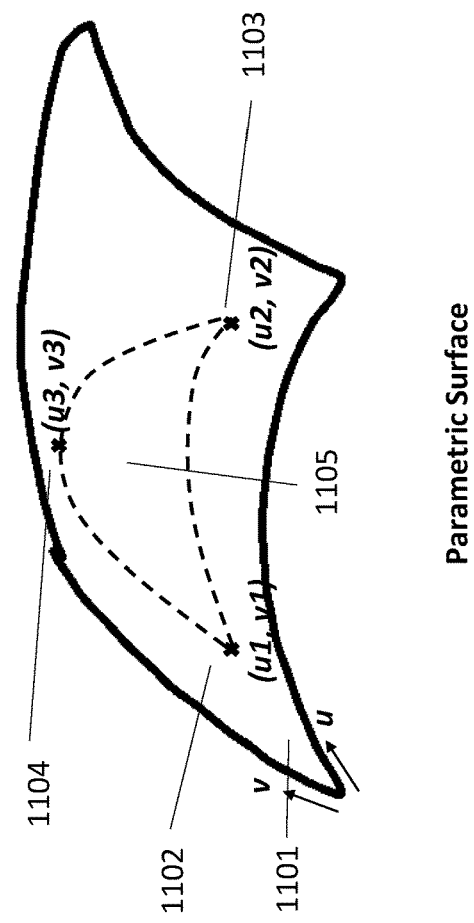
Figure 11

Export a table of those XYZ locations.

| Point | (X, Y, Z) |
|---|---|
| A | (0, 0.4, 5.6) |
| B | (2, 4, 7) |
| C | (3, 6, 10) |
| D | (5, 7, 12.2) |
| etc. | |

Designer pinpoints A-J's *correct* locations on the STL file.

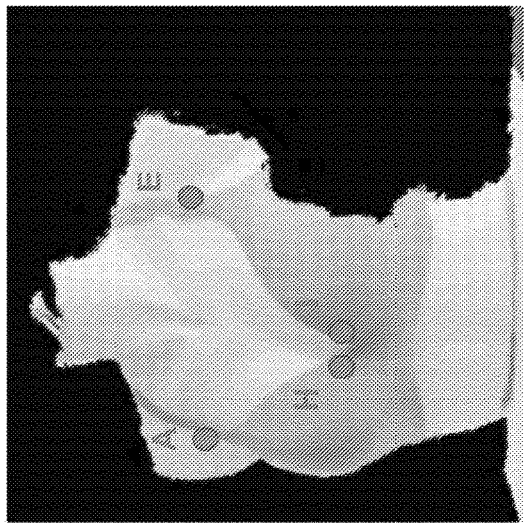

Like in this diagram, the locations of A-J on the Radical bra may be different from those on the current bra. Designer will mark the new locations in the backend design software.

Front and side scans get rendered as 3 STL files.

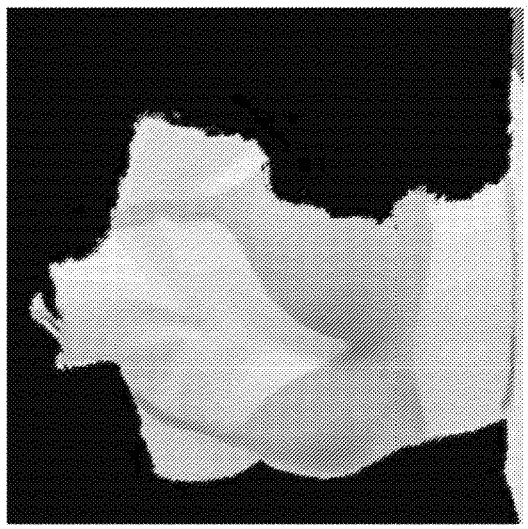

Ex) of the 1 front scan. Unlike this example, there should not be missing data in the official front scan. There should also be 2 side scans.

Figure 13

SYSTEMS AND METHODS FOR DESIGNING AND FABRICATING MASS-CUSTOMIZED PRODUCTS

The present system relates to the method and system for designing and producing custom garments.

BACKGROUND

Bras are a form-fitting, supportive undergarment that covers and elevates the breasts. It is crucial that a woman picks the right bra. Bras that don't fit properly and offer little support will ill-prevent breast tissue to stretch, sag, or otherwise deform over time.

Breasts are held up naturally in two ways: by the internal suspensory ligaments and the skin envelope on the outside that contains the breasts. The bra preserves subtle connections in the wearer's Cooper's ligaments. Bras lift the breasts up. The pull of gravity draws the person's breasts towards the center of their body. Maintaining connective tissue health can help to slow the process of breast deformation, such as in ptosis, or sagging.

Other body parts such as the head or the feet need similar support.

SUMMARY OF THE SYSTEM

The present system is a method for custom garment design and production via data acquisition, analysis, and custom fabrication. One application may be to use the system to design bras that best support a wearer's breasts, and allow for breathable design, customized appearance, and optimal physical support.

In one aspect, systems and methods are disclosed for the fabrication of custom garments with enhanced support for a body part by digitizing a 3D-model of a person, performing anatomy detection and localization of the body part, applying force analysis to design a structure that supports the body part, and fabricating the structure.

In another aspect, the custom garment may be multi-layered, in which different layers work in concert to provide the wearer maximal comfort and support. In one such example, a multi-layered bra includes the following components:

1. Porous outer structure, designed to fill and smooth out areas of the breasts based on the 3-D scan, force analysis, and user's ideal fit as defined by morphing. This porous structure may be meshed. The structure allows the bra to be more breathable and/or fill out any areas where the bra doesn't fit properly (e.g., cup gapping, differently shaped breasts).
2. Base support structure,
a. Added at the base support structure of the bra, designed to uplift the breasts
b. Added at the side of the bra, designed to uplift and push inward the breasts
c. Added support structure of the bra designed to support structure for needed framework, especially for mastectomy or lumpectomy patients In a further aspect, a method is disclosed to iteratively improve the custom garment. The user can wear the garment, take a 3-D scan and/or have a quiz to identify or continuously identify areas of desired improvement. Such information is fed back to a model to create a better design to better serve future users. Thereby, the system can continuously get feedback to improve the design.

Preferably, LiDAR is used to obtain the 3-D scan, but infrared or photogrammetry technology can also be used to determine how much a garment can be stretched and the maximal force that can be applied to the body part, to set a limitation on how much the garment can be altered. This limitation will inform the boundaries for which a feasible garment design is possible. For example, it may inform how closely the garment can be produced to the wearer's desired improvement level.

In another aspect, a method to add attachments to a custom garment is disclosed. For a custom bra, the attachment can include, for example:

a. A thin strap adherent to the top edge of the bra, where skin tightening cream, collagen, or a breast enlargement agent can be slowly released via heat and motion
b. A thin massage strap can be used as well
c. A pouch, adjacent to the nipple pocket, where a soreness-relieving agent to reduce nipple soreness can be released based on the pressure between the nipple pocket and the pouch.
d. A pouch attached to the bra for perfume or deodorant release.

In yet another aspect, a system is disclosed to print a unique barcode on the custom garment to enable rapid retrieval of design and fabrication data. The unique identifier code, such as a 2-D or 3-D barcode, can store customized design information associated with the custom garment and the wearer's body information, and subsequently can be used to retrieve the custom design file of the wearer. Such design, in addition to the current 3-D scan, can be used to evaluate the current force system of the bra, provide suggestions for bra improvement, and set limitations for what kind of targets can be achieved, such as defining the limitations for garment alteration. This force system analysis can help design other types of garments. Using bras as an example, understanding the fit parameters of an everyday t-shirt bra can then inform how to best design custom swimwear, strapless bras, or formalwear bras as non-limiting examples.

Advantages of the system may include one or more of the following. The system may be used to address various garment fit issues, such as footwear, clothing, helmets, among others. While the preferred embodiment is described with respect to bra design and production, the system can be used to fabricate many other custom garments. Therefore, the system will be described in terms of this application, without limiting the scope of how it may be used for other applications as well.

BRIEF DESCRIPTION OF THE DRAWINGS

Turning now descriptively to the drawings, in which similar reference characters denote similar elements throughout the several views, the figures illustrate the present invention.

FIG. 7 illustrates an embodiment of side-by-side comparison of the wearer's current bra vs. their new simulated bra, with and without clothing.

FIG. 10 illustrates an embodiment of the method and system that can also be used for other apparel and related products.

FIG. 11 illustrates an embodiment of the method on how to create patch patterns for sewing/fabrication purposes.

FIG. 13 shows an exemplary user interface to mark points on a 3D model to specify a custom bra.

DETAILED DESCRIPTION OF PREFERRED EMBODIMENT

A detailed description of preferred embodiments of the present invention will be given below with reference to the accompanying drawings. In the following description of the present invention, when it is determined that a detailed description of a related well-known function or element may make the gist of the present invention unnecessarily vague, the detailed description will be omitted.

Overview

This system addresses how to design custom clothing using anatomical detection and localization as well as force analysis so that it not only fits a wearer's body shape and curvature, but also optimally supports the wearer based on physics.

Figure 1:
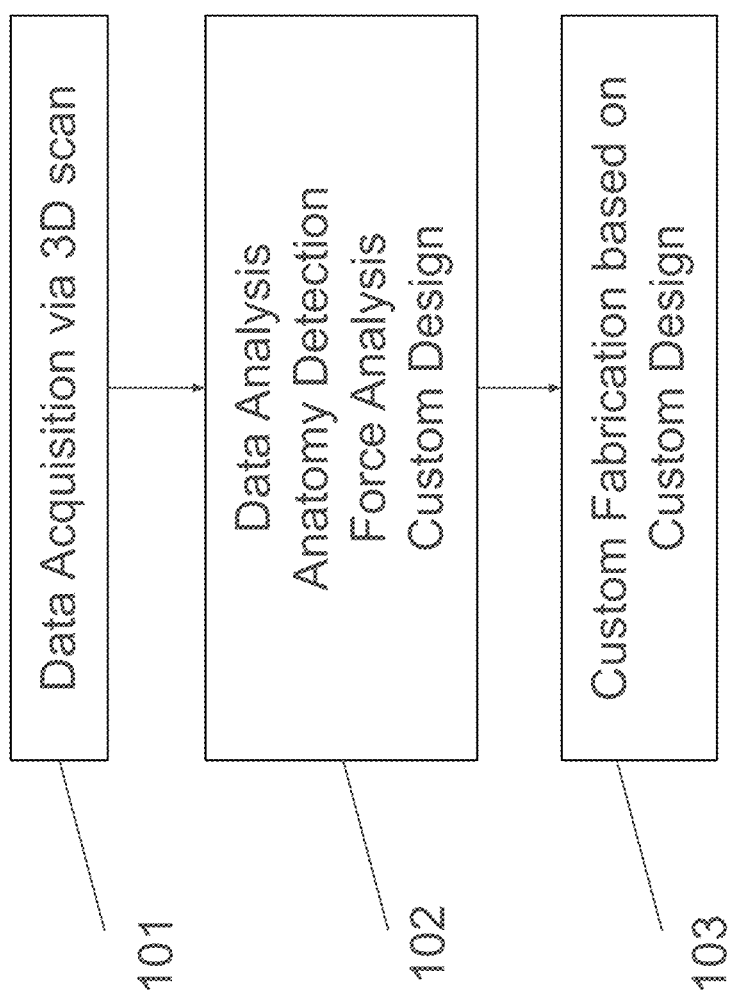
FIG. 1 illustrates an embodiment of the system for designing a custom support structure.

FIG. 1 illustrates an embodiment of the system for designing a custom support structure, which includes the following high-level steps:
1. data acquisition via 3-D scanning
2. data analysis via firstly, anatomy detection and localization, and secondly, force analysis, to specify a custom design that optimally supports the breasts
3. custom fabrication of the garment based on the custom design As used herein a body part may be any part of the human body including the head, neck, hand, foot, torso, among others. The body may be an anatomical structure, but the term also encompasses physiological components such as internal organs. The body part can also include an artificial device or apparatus attached to the body such as a prosthetic brace implant and can be any portion of the body whether natural or artificial on which a designer wishes to improve, protect, maintain, alter, or provide better support.

In more details, the system includes:
Step 1—Collect data via object detection methods which may include 3-D scanning via LiDAR, X-ray, ultrasound, infrared, terahertz, or similar technologies.
Step 2—Based on 3-D scanning data, perform anatomy detection and localization of different areas of the body, such as the breasts. Produce a 3-D model which the designer or wearer may morph to fit the wearer's shape as they so desire. Use force analysis methodologies, detailed below, to produce a design of a custom-fabricated garment.
Step 3—Based on the design, use the various manufacturing means to produce one piece or a set of customized clothing.

The method and system of the current system differ from current custom garment designs for several reasons:
Firstly, the present system extends beyond current solutions by accurately scanning the body using 3-D scanning technology. This system may allow for the production of a 3-D scan using LiDAR, X-ray, ultrasound, infrared, terahertz or similar technologies.
Secondly, this system uses various feature detection tools, such as template matching, curvature analysis, and AI/neural network system to achieve anatomy detection and localization of different areas of the body, such as the breasts, and force analysis to define optimal garment design, such as a bra. The wearer may define how they would like the custom garment design to look using morphing on a 3-D model of their bra. Additionally, a designer may also edit the custom garment design per their discretion. This system allows the use of force analysis methodologies, such as finite element analysis, to design a custom garment that best supports a user's body anatomy, density, weight, and gravity.
Thirdly, this system allows for custom fabrication of a garment, such as a bra to best support a user's breast structure.

The custom garment may include multiple layers which work in concert to provide the wearer optimal fit, comfort, and support. For a custom bra, the multi-layered build may include any or all of the following components:
1. Porous outer structure, designed to fill and smooth out areas of the breasts based on the 3-D scan, force analysis, and user's ideal fit as defined by morphing. This porous structure may be meshed. The structure allows the bra to be more breathable and/or fill out any areas where the bra doesn't fit properly (e.g., cup gapping, differently shaped breasts).
2. Base support structure,
   a. Added at the base support structure of the bra, designed to uplift the breasts
   b. Added at the side of the bra, designed to uplift and push inward the breasts
   c. Added support structure of the bra designed to support structure for needed framework, especially for mastectomy or lumpectomy patients In a further aspect, a method is disclosed to iteratively improve the custom garment. The user can wear the garment, take a 3-D scan and/or have a quiz to identify or continuously identify areas of desired improvement. Such information is fed back to a model to create a better design to better serve future users. Thereby, the system can continuously get feedback to improve the design.

The design and iterative improvement system are informed by the wearer's 3-D scan of their body, force analysis, and the user's ideal fit as defined by morphing, where the structure is added to the garment. In the instance of a bra, the design process may shape, augment, or otherwise alter the breasts, which can still appear natural and form-fitting when the wearer is assuming various positions, such as lying down, bent over, upward, sideways, and engaging in various activities, like jumping, running, walking, as non-limiting examples. The structure, such as a curved inward structure, also prevents issues such as the bra cups gapping away from the breast, the bra detaching from the breast or in any way not being secured to one's body while in movement, or a bra strap sliding off. This base support structure may be made of nylon, rayon, or a similar material.

3. Shape compensation structure, added padding geometry to the bra, designed to compensate the current breasts' unideal situation, such as but not limited to padding over small breasts, added structure to enhance cleavage, and added geometry to mastectomy or lumpectomy patients' breast areas. Unlike traditional bras, the current system allows pocket-like room for nipple hideouts for additional comfort, especially during the wearer's menstrual period or pregnancy period.

Figure 2:
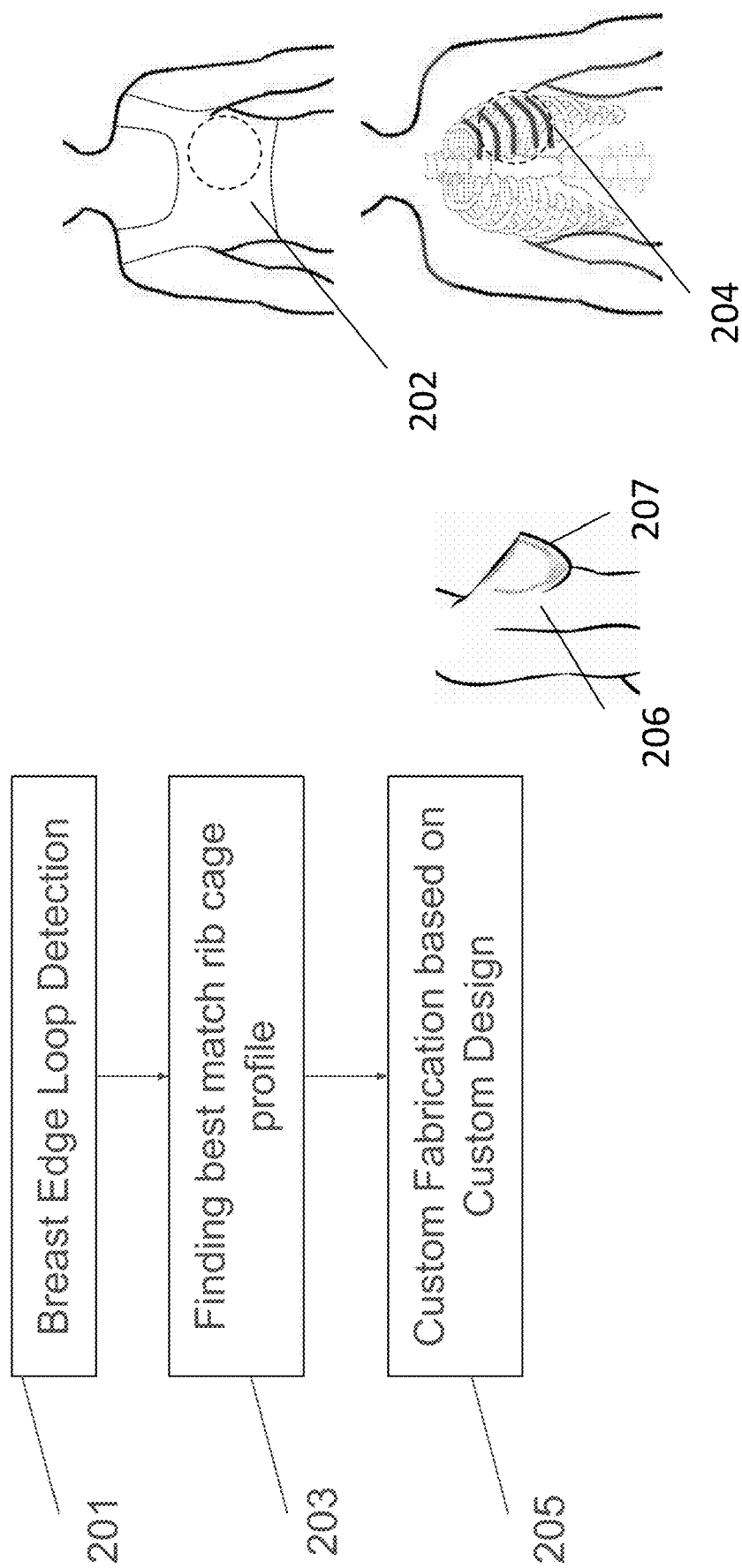
FIG. 2 illustrates the anatomy detection and localization process in its preferred embodiment.

FIG. 2 illustrates the anatomy detection and localization process in its preferred embodiment. Below is one way to conduct anatomy detection and localization:

Step 1: 201 Based on the scanned data, a feature extraction algorithm is used to detect and model the human anatomy. Two methods are typically used to detect the body part region, where the edge loop of the body part, such as a breast 202 is detected:
1. Neural networks—Build the proper neural network and use the labeled existing data to train the network for prediction. With more data collection, the input data can be normalized and scaled. Additionally, when oriented properly, the neural network can improve extraction accuracy.
2. Calculate the high surface curvature changes to detect a loop region. With this information, define the borders of the body part, such as a breast, area.

For a custom bra, the basic algorithm is:

Find the two terrain highest points along the Z-axis, which define the two nipples Apply a rolling ball algorithm by moving the points along the Y-axis of the body, using rolling bowl algorithm to find the smallest ball that can roll and touch the body surface, which is also the same way of detecting the concavity of the surface curvature of the body. This finds a seed point of the breast loop.

Roll the ball freely along the breast surface to determine next highest concavity path. Continue until the ball comes back to the original seed point. This completes the loop for one breast.

Repeat the above process for the second breast.

Step 2: 203 Once the body part region is detected, based on the surface curvature and normalization of regions outside of body part region, the surrounding areas are calculated by matching the surface points and region towards sets of existing ribcage templates. For a custom bra, the surrounding area includes the rib cage profile 204.

This process can be done using Artificial Intelligence algorithm. First, the properly marked data needs to be produced:

The body part for which the custom garment is designed is selected. That body part is then scanned with proper labels of surrounding body parts' information, e.g., via the use of stickers. For a bra, this means properly labeling the bra and then, labeling the ribcage, armpit, or other adjacent body parts. Then, the data marker extracts the scan, uses CAD software to mark the breast region and define the ribcage, and outputs the training data. Such a marking process can also be done by letting subjects obtain CT scans and extracting the ribcage markers and superimposing the data to the scan; however, this latter method may be a more expensive way to prepare the data.

The marked data is then used, for example, via TensorFlow (www.tensorflow.org), to specifically build 20 layers of convolutional neural networks using the Yolo algorithm and the Darken feature detection algorithm:

```
del darknet53_residual_block(inputs, filters, training, data_format,
            strides=1):
    """Creates a residual block for Darknet."""
    shortcut = inputs
    inputs = conv2d_fixed_padding(
        inputs, filters=filters, kernel_size=1, strides=strides,
        data_format=data_format)
    inputs = batch_norm(inputs, training=training, data_format=data_format)
    inputs = tf.nn.leaky_relu(inputs, alpha=_LEAKY_RELU)
    inputs = conv2d_fixed_padding(
        inputs, filters=2 * filters, kernel_size=3, strides=strides,
        data_format=data_format)
    inputs = batch_norm(inputs, training=training, data_format=data_format)
    inputs = tf.nn.leaky_relu(inputs, alpha=_LEAKY_RELU)
    inputs += shortcut
    return inputs
def darknet53(inputs, training, data_format):
    """Creates Darknet53 model for feature extraction."""
    inputs = conv2d_fixed_padding(inputs, filters=32, kernel_size=3,
                    data_format=data_format)
    inputs = batch_norm(inputs, training=training, data_format=data_format)
    inputs = tf.nn.leaky_relu(inputs, alpha =_LEAKY_RELU)
    inputs = conv2d_fixed_padding(inputs, filters=64, kernel_size=3,
                    strides=2, data_format=data_format)
    inputs = batch_norm(inputs, training=training, data_format=data_format)
    inputs = tf.nn.leaky_relu(inputs, alpha=_LEAKY_RELU)
    inputs = darknet53_residual_block(inputs, filters=32, training= training,
                    data_format=data_format)
    inputs = conv2d_fixed_padding(inputs, filters= 128, kernel_size=3,
                    strides=2, data_format=data_format)
    inputs = batch_norm(inputs, training=training, data_format=data_format)
    inputs = tf.nn.leaky_relu(inputs, alpha =_ LEAKY_RELU)
    for _ in range(2):
        inputs = darknet53_residual_block(inputs, filters=64,
                    training=training,
                    data_format=data_format)
    inputs : conv2d_fixed_padding(inputs, filters=256, kernel_size=3,
                    strides=2, data_format=data_format)
    inputs = batch_norm(inputs, training=training, data_format=data_format)
    inputs = tf.nn.leaky_relu(inputs, alpha=_LEAKY_RELU)
    for _ in range(8):
        inputs = darknet53_residual_block(inputs, filters=128,
                    training=training,
                    data_format=data_format)
    route1 = inputs
    inputs = conv2d_fixed_padding(inputs, filters=512, kernel_size=3,
                    strides=2, data_format=data_format)
    inputs = batch_norm(inputs, training=training, data_format=data_format)
    inputs = tf.nn.leaky_relu(inputs, alpha=_LEAKY_RELU)
    for _ in range(8):
        inputs = darknet53_residual_block(inputs, filters=256,
                    training=training,
                    data_format=data_format)
    route2 = inputs
    inputs = conv2d_fixed_padding(inputs, filters= 1024, kernel_size=3,
                    strides=2, data_format=data_format)
    inputs = batch_norm(inputs, training=training, data_format=data_format)
    inputs = tf.nn.leaky_relu(inputs, alpha=_LEAKY_RELU)
    for _ in range(4):
        inputs = darknet53_residual_block(inputs, filters=512,
                    training=training,
                    data_format=data_format)
    return route1, route2, inputs
```

Step 3: 205 The scan of the focal body part is then subtracted from the surrounding body area profile to define the focal body part more clearly and accurately. For example, to design a bra, subtract the scan of the breast from the rib cage profile to define the solid model of the breast. In this example, the model contains two parts:

1. Breast top surface area 206 (side view shown)
2. Breast base surface attached to rib cage 207 (side view shown)

Figure 3:
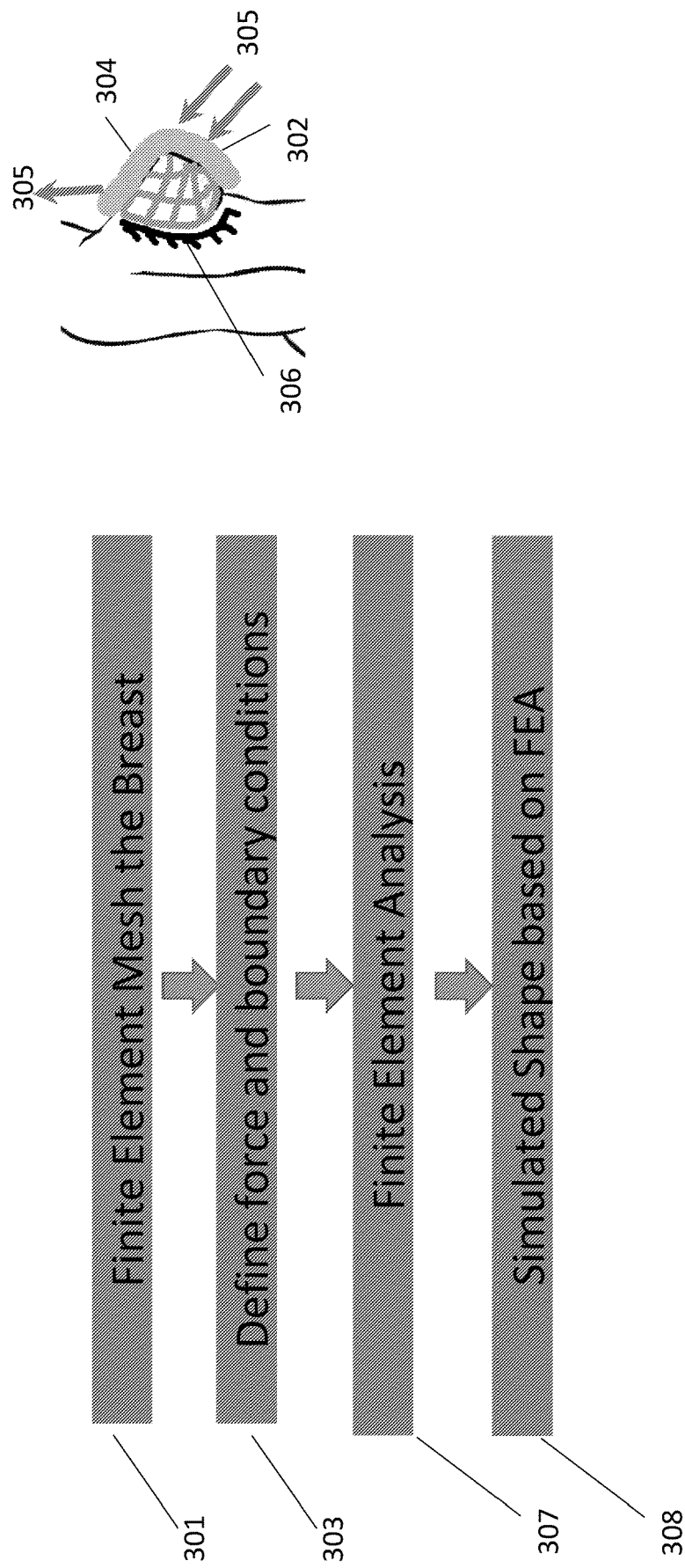
FIG. 3 shows an exemplary force analysis method as applied to the designed structure.

FIG. 3 illustrates an exemplary force analysis deformation process in its preferred embodiment. Below is one way to calculate deformation:
1. The objective is to use a finite element meshing process to subdivide the body part into elements 302. For instance, the elements can be cubes as illustrated in 302 (side view is shown so only quadrilaterals are displayed).
2. For the example of a bra, the bra 304 pushes against part of the breast element with a certain amount of force 305. Additionally, the ribcage serves as a hard wall where nodes of the corresponding element have no or very limited movement. The ribcage may be set as a boundary condition 306.
3. Based on the boundary condition force, each element is deformed as illustrated above and will push its neighbor elements in a domino effect manner, with the assumed conditions that 1) the volume of each element will remain constant or see little change and 2) the cube integrity will not change even under sheared force.
4. Once the equal balance of all the nodes remains stable or converges, the deformation status is reached.

Figure 4:
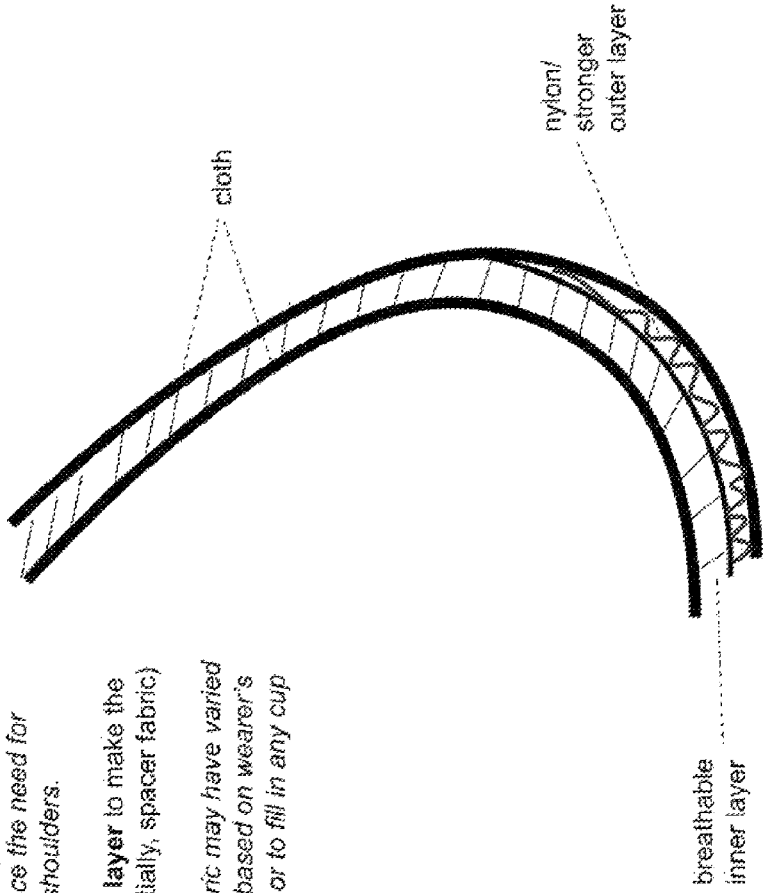
FIG. 4 illustrates an exemplary multi-layered custom-fabricated bra.

FIG. 4 illustrates an embodiment of the final product of a custom garment. In this instance, it is a multi-layered custom-fabricated bra which may include the following components:
1. A porous outer structure, designed to fill and smooth out areas of the breasts based on the 3-D scan, force analysis, and user's ideal fit as defined by morphing. This porous structure may be meshed. The structure allows the bra to be more breathable and/or fill out any areas where the bra doesn't fit properly (e.g., cup gapping, differently shaped breasts).
2. A base support structure, added at the bottom of the bra, designed to uplift the breasts based on the 3-D scan, force analysis, and user's ideal fit as defined by morphing. This base support structure may be made of nylon, rayon, or a similar material.

In one embodiment, a nylon outer layer is provided at the base of the bra to uplift the breast. The nylon outer layer uplifts the breast from its base to reduce the pressure on the bra strap or the wearer's shoulders. A soft inner porous mesh layer enables the bra to be breathable and may act as a spacer fabric. The spacer fabric may have varied thickness to adjust the bra shape based on the wearer's desired look (such as for augmentation purposes) or to fill in any cup gaps that may exist in differently shaped breasts, for example. The order of the layers is interchangeable. The preferred embodiment is for the inner layer to be the porous one and outer to be of a harder (e.g., nylon) material. That way, the harder material doesn't cause discomfort to the wearer. However, in other embodiments, the inner layer can be the nylon material while the outer layer is porous, for example.

Figure 5:
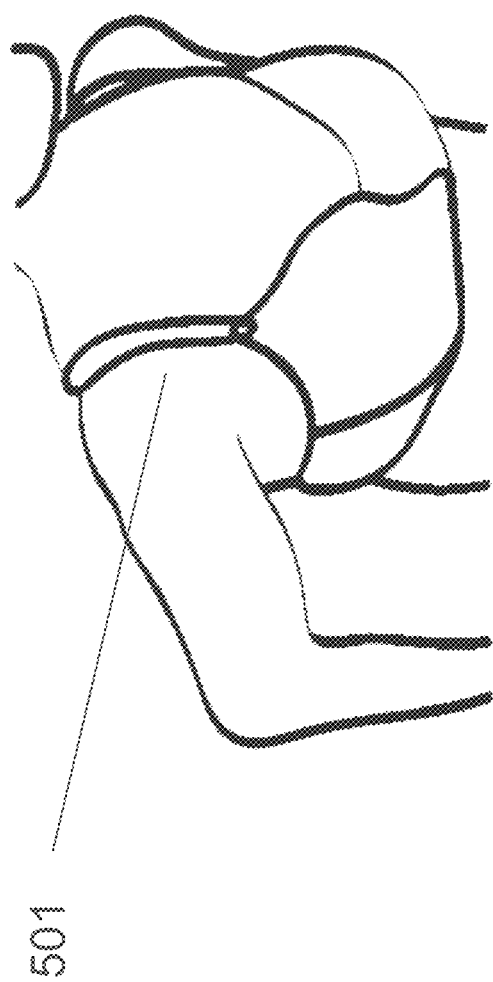
FIG. 5 illustrates an embodiment of continuing to improve the product based on user feedback.

FIG. 5 illustrates an embodiment for continuing to improve the product based on user feedback. Users use an app, website, or similar interface to point to the area of the 3-D model or a photo they want to improve 501. When the focus point area is picked, options will be provided for the user to choose how they the product to be improved (e.g., for a bra, to tighten the strap by ⅛ inch).

In certain instances, in order to make sure the user's target is within the safe zone, a new 3-D scan is required. The user needs to first input what bra she is wearing by providing the product ID or taking a scan (e.g., photo) of the unique barcode on the bra. Once the scan is taken, the photo analysis software calculates how the bra is stretched and how much of the body is compressed. Henceforth, a safe zone number is defined based on the value just calculated.

Figure 6:
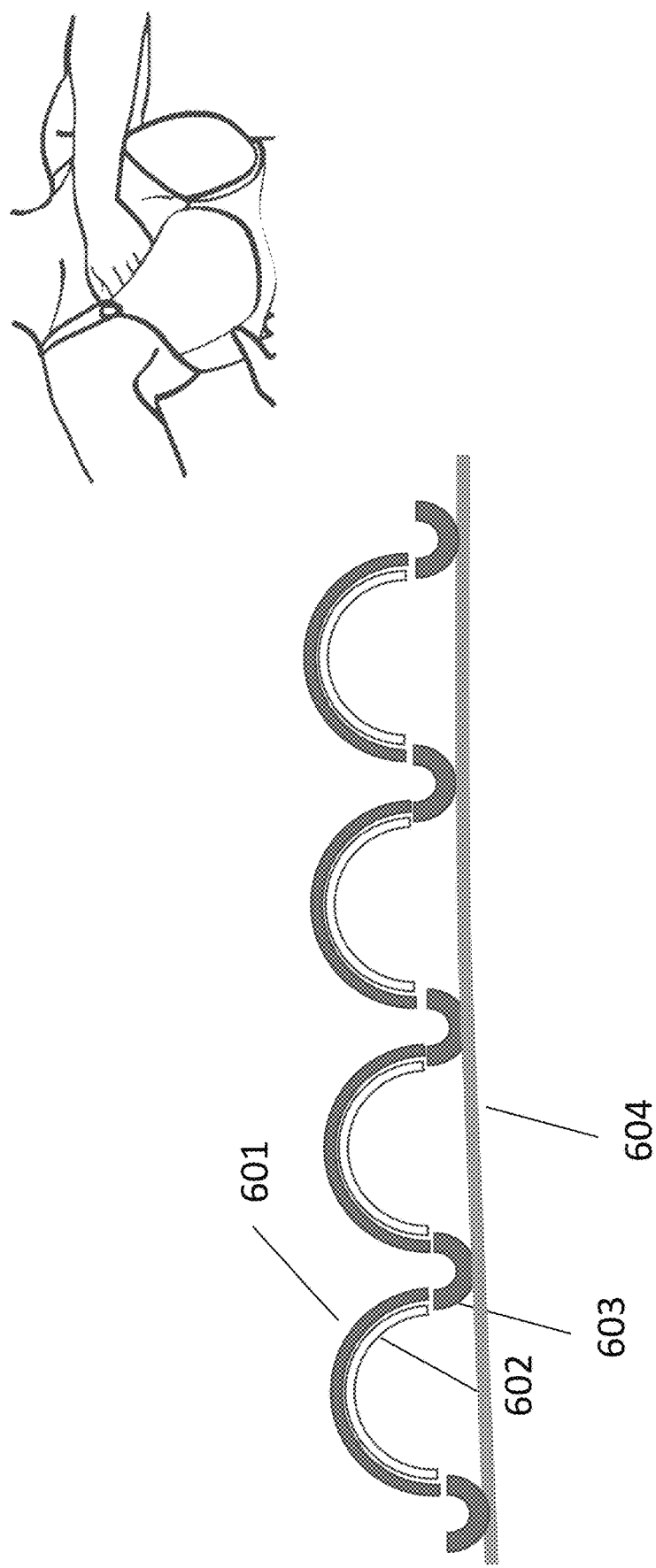
FIG. 6 illustrates an embodiment of a bra strap design to avoid cup gapping and/or slippage.

FIG. 6 pertains to one embodiment of a custom garment, the custom bra. Specifically, it illustrates an embodiment of a bra strap design to avoid bra cup gapping, spillage, or otherwise ill-fit. A cross-section of strap is shown in FIG. 6. Outer layer strap 601 has less bending force than inner layer stripe 602. The two layers are connected by the more rigid/less flexible connector 603. The inward bending force enables the strap to bend towards the body 604, even in less desirable positions like the body bending over, which may result in undesired bra gaps or otherwise ill-fit. Similar structure can be used on the cup to close gapping when the wearer is in different positions. A similar structure can be used for straps for the cups to conform and bend towards the center of the body to avoid bra strap slippage and to best fit the body shape.

FIG. 7 illustrates an embodiment of a side-by-side comparison of an old garment vs. new simulated garment with and without clothing. The simulation software shows the difference between the two by providing:
1. An animation which morphs from the body with the original garment to a simulation of what the body would look like with the new garment.
2. An animation which fades from the body with the original garment to a simulation of what the body would look like with the new bra.
3. An animation which morphs from the way clothing looked with the original garment to a simulation of how that same clothing would look with the new garment.
4. An animation which fades from the way clothing looked with the original garment to a simulation of how that same clothing would look with the new garment.
5. Side-by-side comparison of old 701 versus new simulated 702, and focus point 703 that shows exactly where and what changes occurred.
6. Side-by-side comparison of clothing with old 704 vs new simulated 705, and focus point 706 exactly where and what changes occurred.

Figure 8:
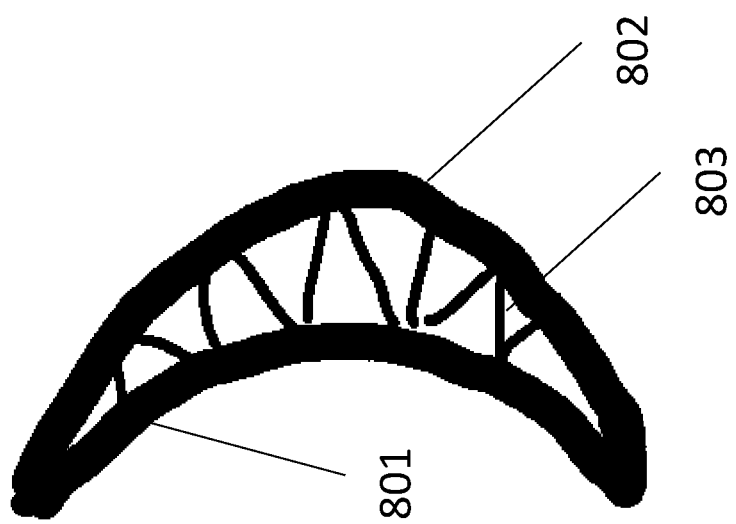
FIG. 8 illustrates an embodiment of the outer layer of the multi-layered bra structure.
Figure 9:
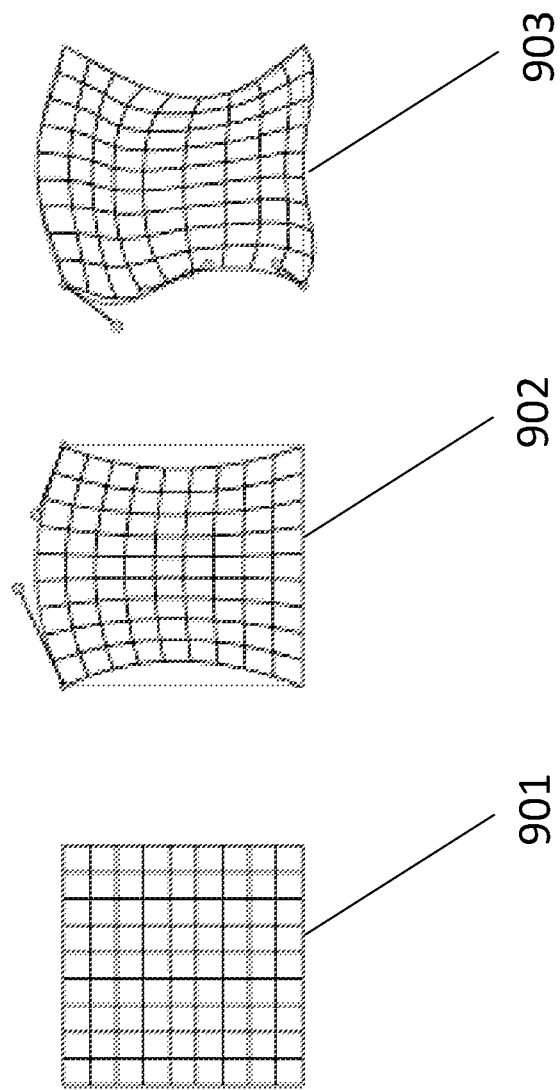
FIG. 9 illustrates an embodiment of the method and system to calculate the force applied to the body while wearing the custom-designed bra.

FIG. 8 illustrates an embodiment of a multi-layered garment, specifically, the construction of the custom bra structure, where the inner layer 801 contacts and supports the breast based on force analysis, the outer layer 802, provides the shape of bra, and the mid-layer 803 creates the support between inner and outer layers. Unlike in other bras which are rigid like a body shield, do not follow different body postures or activities, are not flexible, and provide little if any shaping or lifting, the three layers of this bra work together in concert to make the bra more of an addition to the body with a more natural look and proper comfort, as well as make it feel more lightweight and breathable to the wearer. To make such a multi-layered structure, the following manufacturing methods may be adopted:
1. 3-D printing
2. Milling
3. Multi-layer pressing, a process similar to that used to make shoe soles
4. Multi-layer casting FIG. 9 illustrates an embodiment of the method and system to calculate force applied to the body while wearing the custom-designed garment. In the example of a bra, when the bra is made, special patterns or dots are printed on the surface, 901 illustrated as a simple grid. When the user wears the bra, this pattern gets stretched 902 or twisted 903. Additionally, based on the deformation of the patterns and the 3-D geometry changes based on the scan, the force is calculated based on the bra material property, especially the elasticity. Such force is used to set a limit on how the current bra can be modified.

FIG. 10 illustrates an embodiment of the method and system that can also be used for other custom garments and related products, for instance, a shape-wear undergarment, before 1001 and simulated after 1002, so a similar process to that described in the bra section can be used.

The bra support structure is made up of various types of forces as described above. Each force has a shape and/or direction of application. The bra design is created to take advantage of these various forces to create the best bra possible. At the same time the design must ensure that the user can comfortably wear the bra, and this can be done by ensuring the design meets minimum comfort requirements as defined in part by subjective questionnaire responses for wearing the bra. As an example, the front of the bra could feature straps while the back of the bra could have a hook and eye system of enclosures. One embodiment involves designing a bra with three goals: 1) supporting breast tissue, 2) preventing excessive stretching of breast tissue, and 3) providing flexibility and adjustability. The breast support may include more than just keeping the breasts from drooping; it may also include providing lift positioning or cleavage for the wearer.

FIG. 11 illustrates an exemplary method to create patch patterns for fabricating a custom garment, such as a bra. Using the example of a bra, in one embodiment, for sewing the bra, first, the bra shape is parametrized with a parametric surface such as a spine surface or NURB (Non-Uniform Rational Spline) surface 1101. In this embodiment, variable u can be defined as direction towards the rib cage line, and v can be defined as the center line perpendicular to u. The parametric (u, v) coordinates the key control points 1102, 1103, 1104, which define the sub-patch or pattern 1105 are calculated, then mapped by plugging to pattern surface 1111, based (u, v) coordinates of pattern surface key points 1112, 1113, 1114, to calculate the sub-patch or pattern in 2D space, sometimes with the offset line 1116 also calculated for sewing purposes. For current multi-layered apparatuses, to make the pattern-matching consistent for all layers, one implementation parameterizes a uv patch, and the third dimension, which is orthogonal to u and v, is introduced. A hyper-solid patch can be calculated and enables all layers in the same coordinate system to be calculated in the same way.

In another embodiment, a predefined set of templates for bras can be created in advance for performance. The templates can then be customized to the individual characteristics as follows:
creating a "set": how you design and manufacture a set of bras
separate algorithms to make each bra within the set and correspondingly, different manufacturing processes to create the custom bra.

Figure 12A:
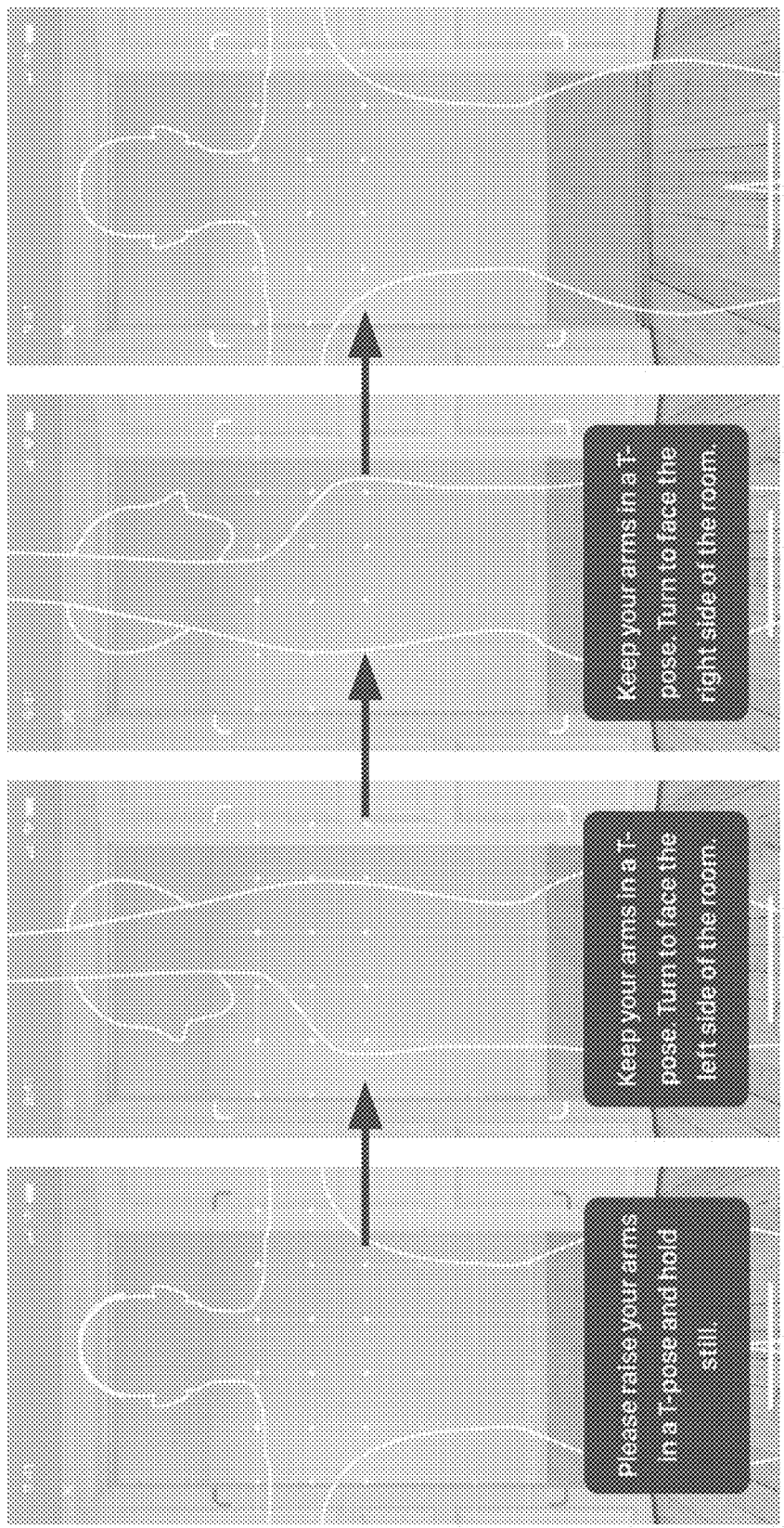
FIG. 12A shows an exemplary user interface to capture a body shape.
Figure 12B:
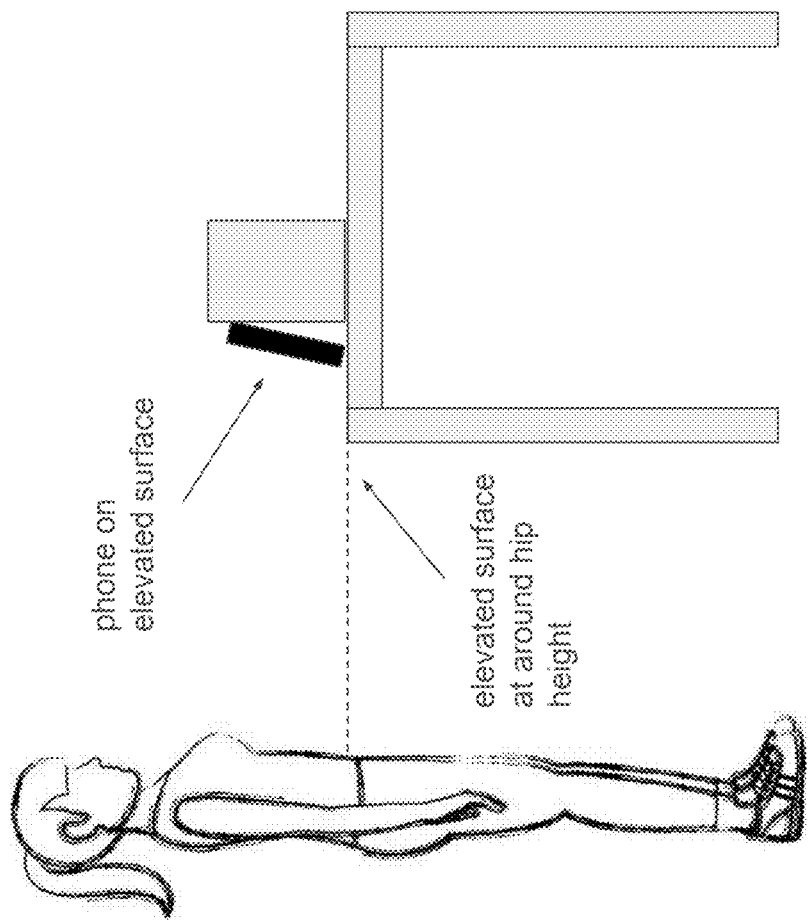
FIG. 12B shows an exemplary placement of a mobile device, smart phone or smart device to capture the body shape and spline.

FIGS. 12A and 12B pertain to an exemplary app-scanning process for a mobile device, smart phone or tablet, or smart watch among others. In this preferred embodiment, the user stands in front of their phone in the position exemplified in FIG. 12B. In this example, the device is placed on an elevated surface, in which the bottom of the device is at hip height, as close to an upright position as possible. The user is then sent through a guided process, which may include poses such as to stand facing forward, left, and right, among others. The app takes several scans and then produces 3-D (e.g., CAD, STL, .step, .obj) files of the user's body while wearing their current best-fitting bra.

FIG. 13 demonstrates how the 3-D file obtained from the data capture process, such as the one detailed in FIG. 12, can be used to obtain key measurements on the wearer's body. The software may use feature extraction analysis to define several key points on the garment as the calibration initial points. A designer may then, per their discretion, edit the locations of those initial points to produce the official XYZ locations of salient points of the garment, thereby defining the proper, custom measurements for a wearer's custom garment.

Figure 14:
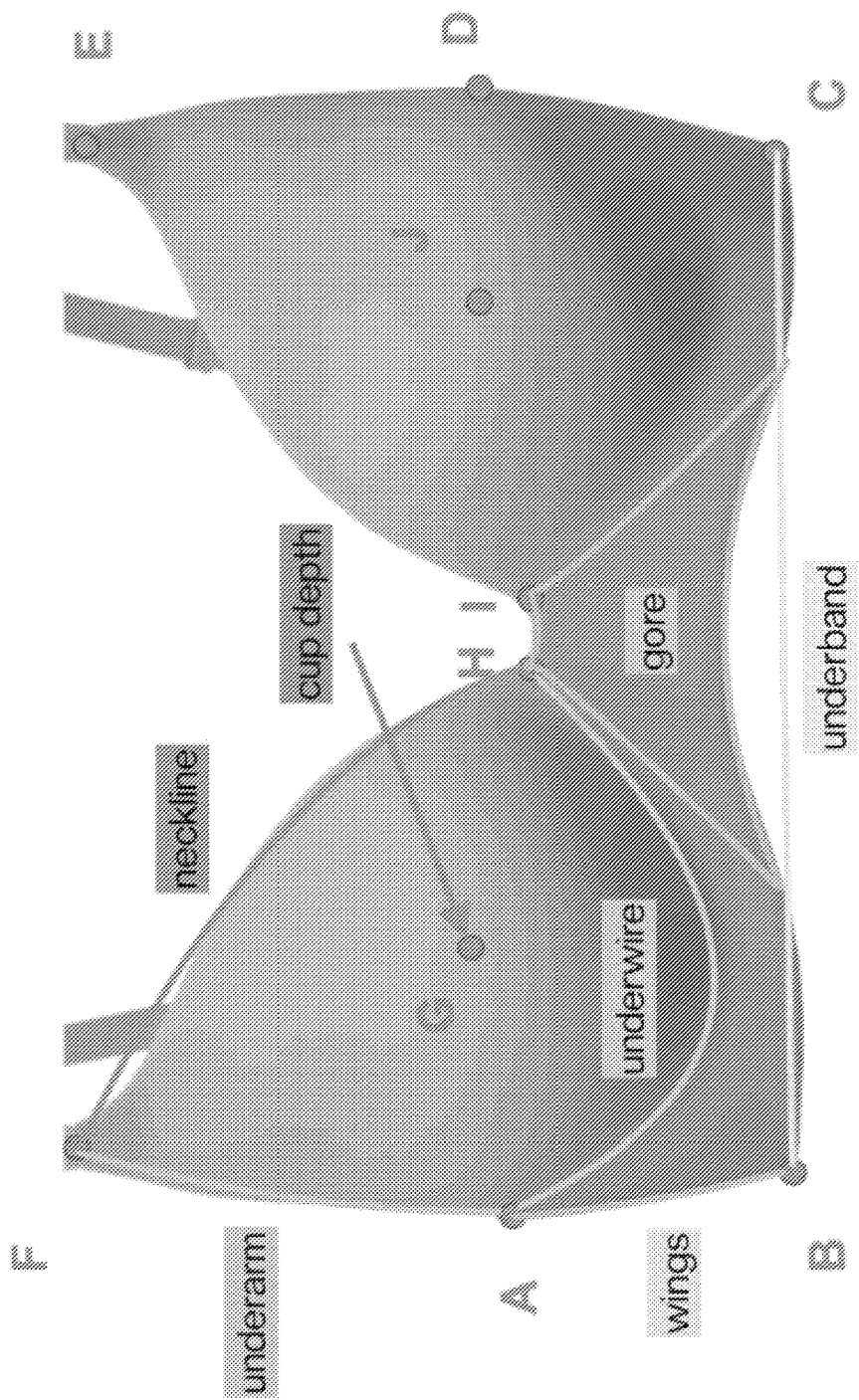
FIG. 14 shows an exemplary design of the custom bra.

1. FIG. 14 demonstrates some of exemplary points A-J that may be editable on the backend design software described in FIG. 13. Moving these points then defines the measurements and dimensions of key parts on the garment. In the example of a bra, some of these parts include the gore, underarm, and underwire, as examples.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to fabricate a custom bra garment for a wearer, comprising:
   capturing body parameters with a three-dimensional (3D) scan of a breast;
   detecting the breast anatomy using artificial intelligence;
   applying a breast force analysis to the detected wearer breast anatomy; and
   fabricating the bra garment optimized to support and fit the breast of the wearer based on the breast force analysis;
   providing a simulation comparing an original bra with the custom-designed bra; and
   providing:
   an animation which morphs from the body with the original bra to a simulation of what the body would look like with the custom-designed bra;
   an animation which fades from the body with the original bra to a simulation of what the body would look like with the custom-designed bra;
   an animation which morphs from the way clothing looked with the original bra to a simulation of how that same clothing would look with the custom-designed bra;
   an animation which fades from the way the wearer looked in an overgarment while wearing the original bra to a simulation of how the wearer looks in the same article of clothing while wearing the custom-designed bra underneath;
   a side-by-side comparison of original and custom-designed bras, with visual guide(s) to identify and/or highlight one or more changes; and
   a side-by-side comparison of clothing with original and custom designed bras, and visual guide(s) to identify and/or highlight one or more changes.

2. The method of claim 1, comprising fabricating a bra from the custom design.

3. The method of claim 1, comprising generating a 3-D representation of a body part to the detected wearer breast anatomy.

4. The method of claim 1, comprising defining force and boundary conditions of the force analysis.

5. The method of claim 1, comprising applying a finite element mesh to the detected wearer breast anatomy including rib cage.

6. The method of claim 1, comprising generating a simulated geometry of the custom garment based on the force analysis.

7. The method of claim 1, wherein the 3-D scan comprises a scan with a mobile device.

8. The method of claim 7, comprising placing the mobile device in front of the wearer to capture the wearer's body information.

9. The method of claim 7, comprising displaying a 3-D mannequin on a mobile device screen.

10. The method of claim 9, comprising requesting the wearer to raise both hands to match the body outline.

11. The method of claim 7, comprising showing a side body outline on a mobile device screen with arms raised approximately vertical to the ground.

12. The method of claim 11, comprising requesting the wearer to raise their hands to imitate the body outline displayed on the mobile device screen.

13. The method of claim 7, comprising
   showing a frontal body outline on a mobile device screen with arms raised;
   requesting the wearer to raise both hands to match the frontal body outline and capturing a first set of body information and measurements of the wearer;
   showing a side body outline on a mobile device screen with arms raised;
   requesting the wearer to raise both hands to match the side body outline and capturing a second set of body information and measurements of the wearer; and
   creating the 3-D body visualization informed by the first and second sets of body data capture.

14. The method of claim 1, comprising:
   showing the custom design on a screen;
   receiving a plurality of point designations on the custom garment; and
   mapping the plurality of point designations to the custom garment.

15. The method of claim 14, comprising using the point designations to extract features of the custom garment.

16. The method of claim 1, further comprising parameterizing with a parametric surface, wherein a variable u comprises a direction towards a rib cage line, and a variable v comprises a center line perpendicular to u and the parametric (u, v) coordinates represent key control points defining a sub-patch or pattern which is mapped to a pattern surface using (u, v) coordinates of pattern surface key points to calculate the sub-patch or pattern in two-dimensional space.

17. The method of claim 1, wherein detecting the wearer breast anatomy further comprises performing a breast edge loop detection and finding a best matching rib cage profile to the wearer based on the wearer breast anatomy.

18. A system machine to manufacture a custom breast garment, comprising:
   a scanner to capture body parameters with a three-dimensional (3-D) scan of a breast;
   a processor coupled to the scanner, the processor executing code to:
   detect a wearer's breast anatomy using artificial intelligence;
   apply force analysis to the detected wearer breast anatomy;
   provide a simulation comparing an original bra with the custom-designed bra; and
   provide:
   an animation which morphs from the body with the original bra to a simulation of what the body would look like with the custom-designed bra;
   an animation which fades from the body with the original bra to a simulation of what the body would look like with the custom-designed bra;
   an animation which morphs from the way clothing looked with the original bra to a simulation of how that same clothing would look with the custom-designed bra;
   an animation which fades from the way the wearer looked in an overgarment while wearing the original bra to a simulation of how the wearer looks in the same article of clothing while wearing the custom-designed bra underneath;
   a side-by-side comparison of original and custom-designed bras, with visual guide(s) to identify and/or highlight one or more changes; and
   a side-by-side comparison of clothing with original and custom designed bras, and visual guide(s) to identify and/or highlight one or more changes; and generate a custom design and fabricate the custom breast garment.

19. The system of claim 18, wherein the custom garment comprises a bra and the code to detect the wearer breast anatomy further comprises code to perform a breast edge loop detection and code find a best matching rib cage profile to the wearer based on the wearer breast anatomy.

\* \* \* \* \*